June 4, 1946.  E. S. ENGLE  2,401,417
DISPENSING SYSTEM
Original Filed Dec. 26, 1940  6 Sheets-Sheet 1

INVENTOR
Edgar S. Engle.
BY
S. A. Stricklett
ATTORNEY

June 4, 1946.  E. S. ENGLE  2,401,417
DISPENSING SYSTEM
Original Filed Dec. 26, 1940   6 Sheets—Sheet 2
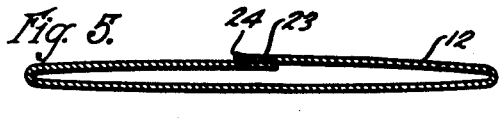
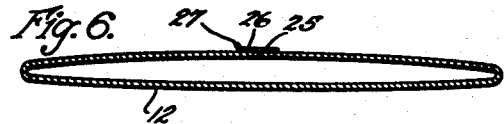
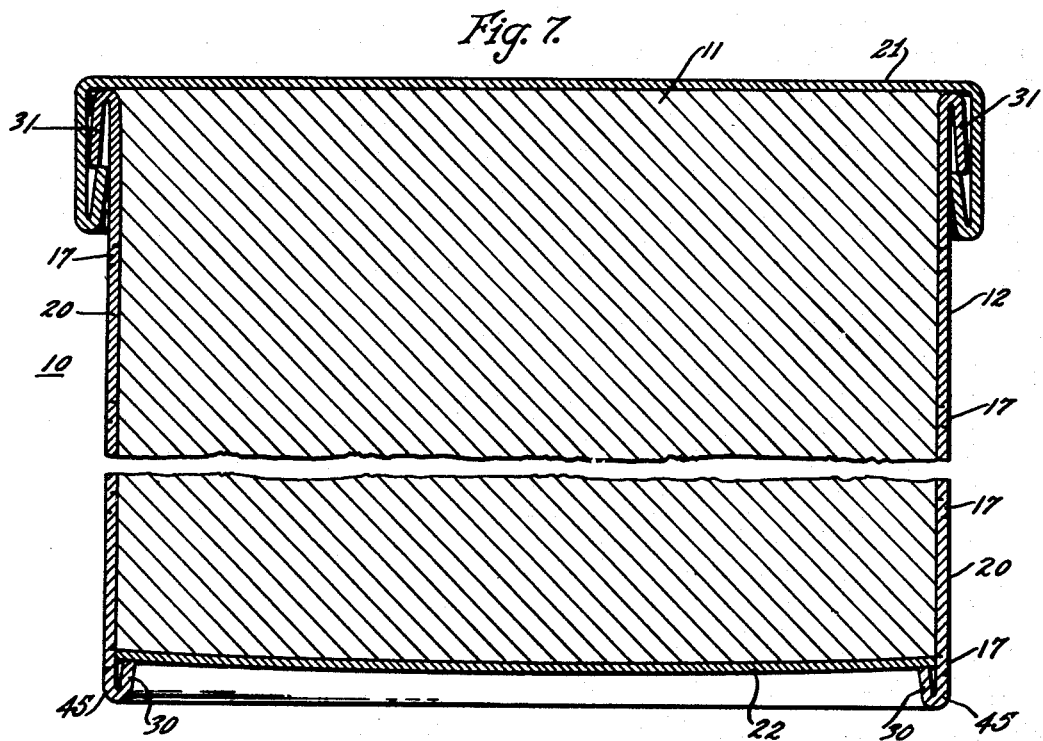
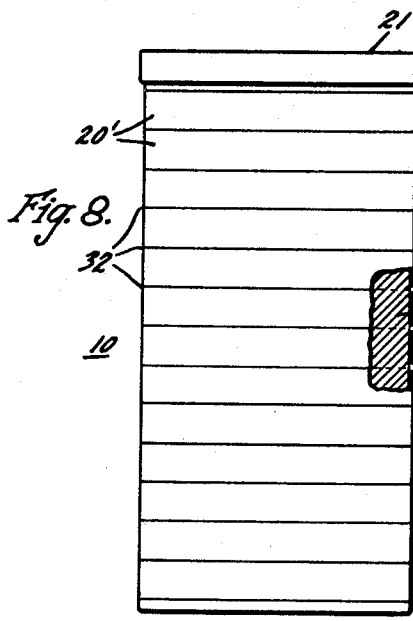
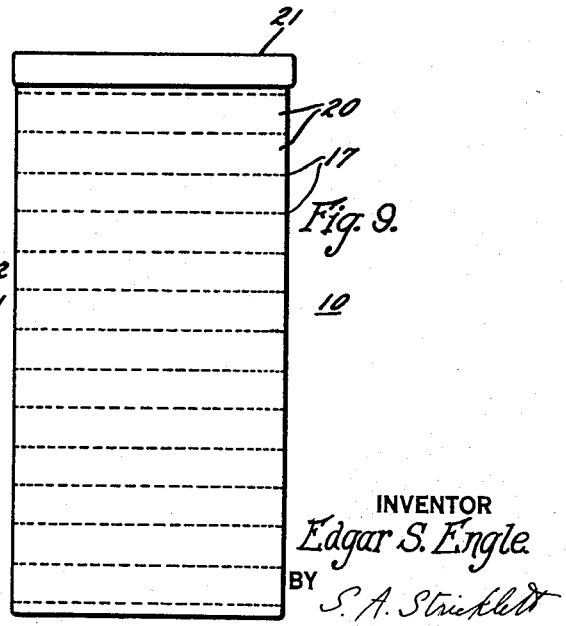
INVENTOR
Edgar S. Engle
BY
S. A. Stricklett
ATTORNEY

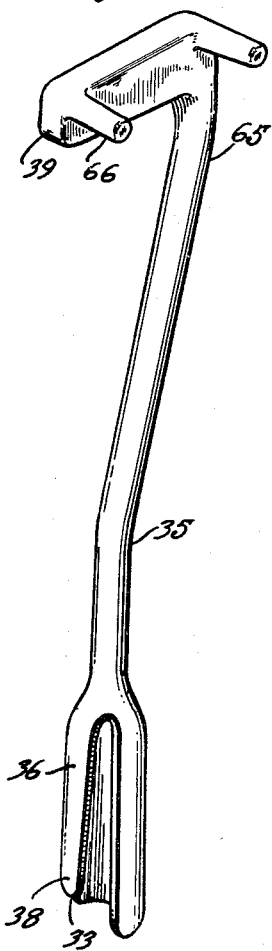
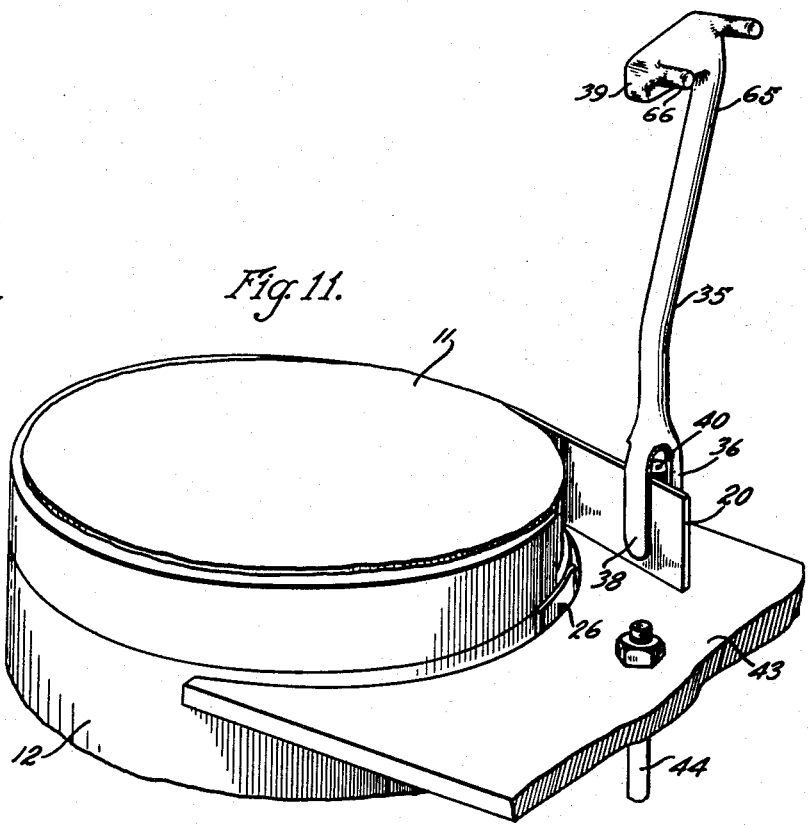
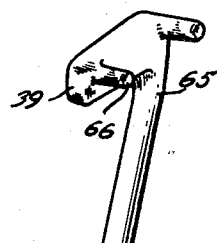
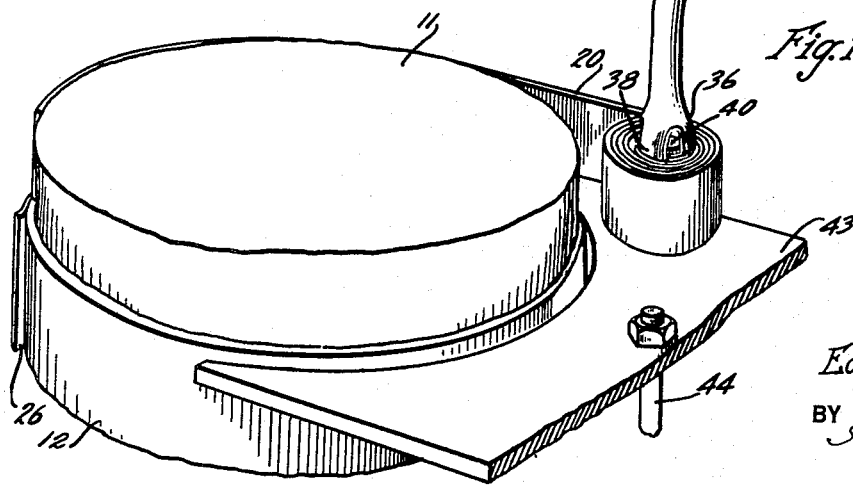

June 4, 1946. E. S. ENGLE 2,401,417
DISPENSING SYSTEM
Original Filed Dec. 26, 1940 6 Sheets-Sheet 4
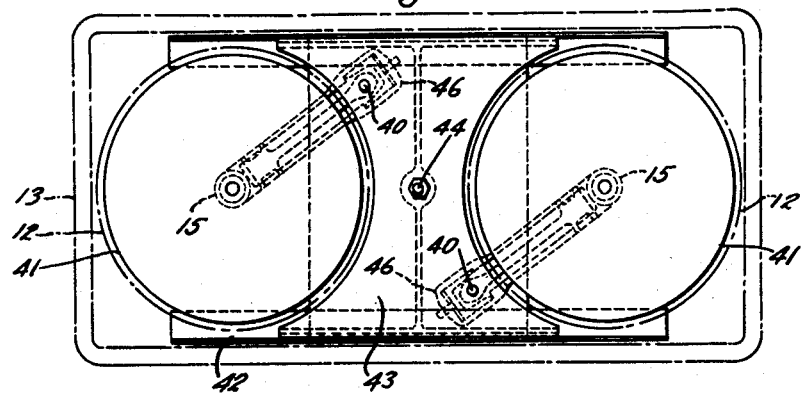
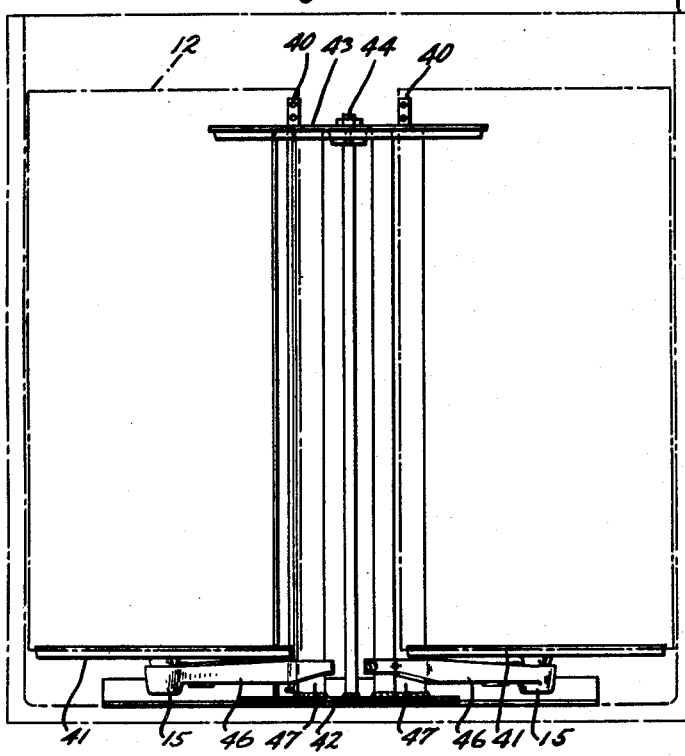
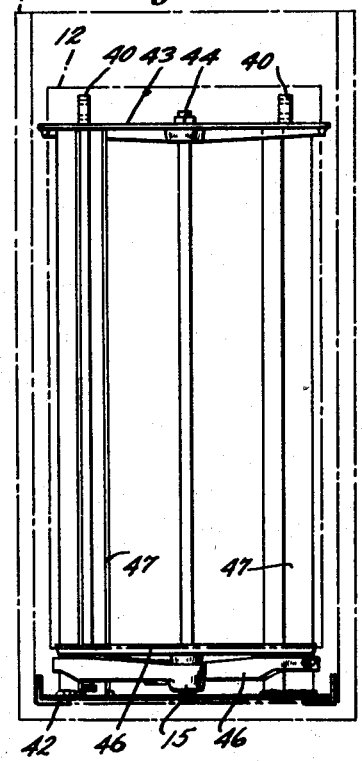
INVENTOR
Edgar S. Engle.
BY
S. A. Stricklett
ATTORNEY

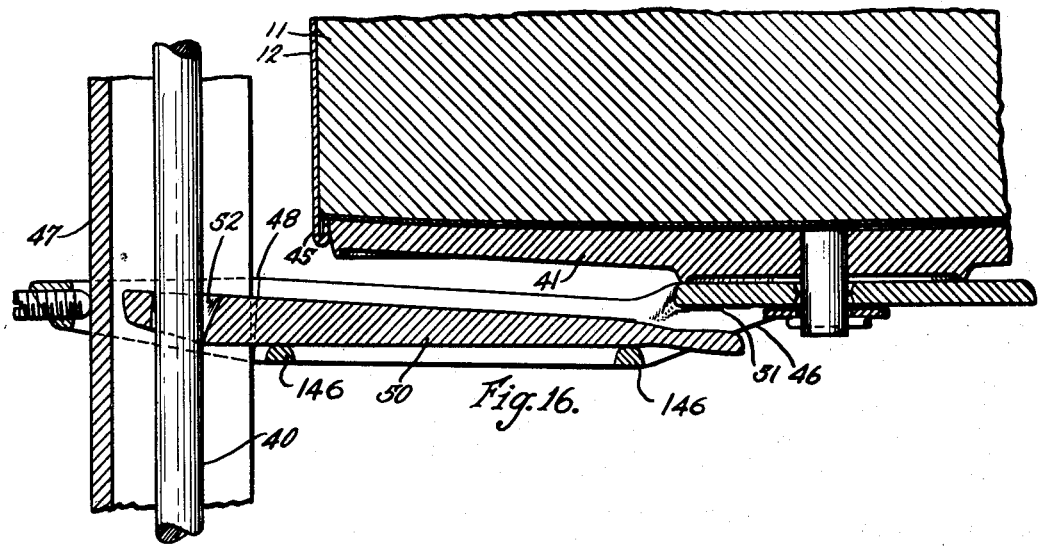
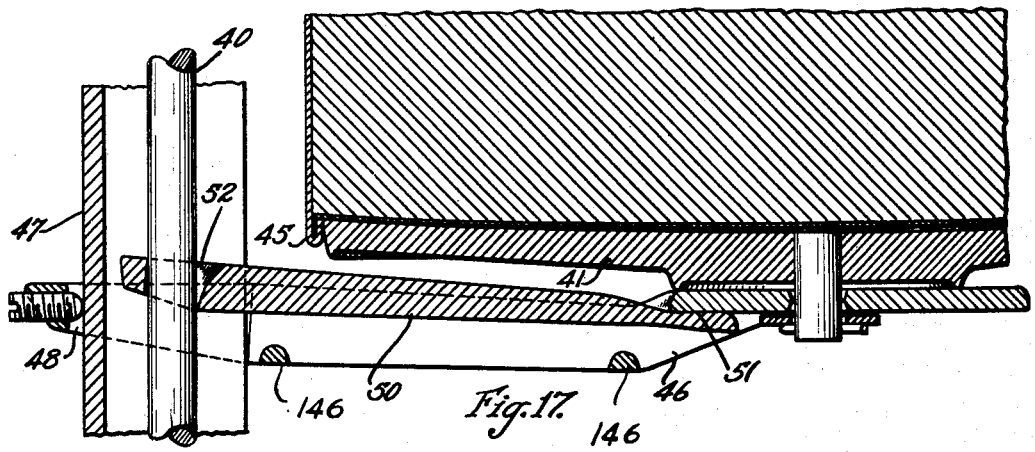
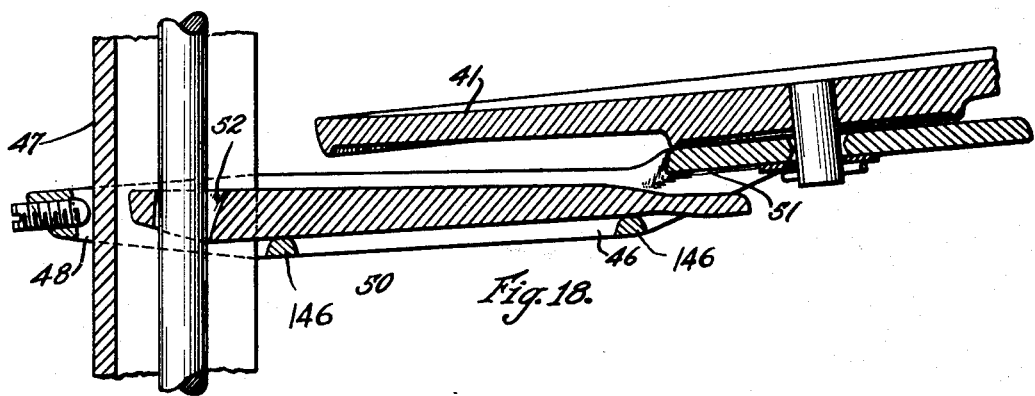

June 4, 1946.  E. S. ENGLE  2,401,417
DISPENSING SYSTEM
Original Filed Dec. 26, 1940  6 Sheets—Sheet 6

INVENTOR
Edgar S. Engle.
BY
S. A. Stricklett
ATTORNEY

Patented June 4, 1946

2,401,417

UNITED STATES PATENT OFFICE 2,401,417

DISPENSING SYSTEM

Edgar S. Engle, Greensburg, Pa.

Original application December 26, 1940, Serial No. 371,683. Divided and this application May 29, 1943, Serial No. 489,252

13 Claims. (Cl. 312—35)

My invention relates to a dispensing system, and particularly to a system for dispensing solidified confections, such as ice cream, sherbets, ices, puddings and the like.

This application is a division of my copending application Serial No. 371,683, filed December 26, 1940, entitled Dispensing system.

In the dispensing of ice cream and other such solidified confections, it has heretofore been customary to provide the confection in solidified form in a container of appreciable size, usually for commercial purposes in a five gallon size container.

The present-day commercial ice cream is composed of a so-called ice cream mix which is filled with air to produce a light, delicate flavored material. In scooping this material from the containers, a large proportion of the air bubbles or cells are broken down so that not only is a large volume of the material lost, but the delicate flavor of the confection is impaired.

The breaking down of the air cellular structure not only destroys the flavor, but causes a material loss to the handlers in that the volume of sales is greatly reduced; the average number of cones that can be taken from a five gallon container of ice cream being in the neighborhood of 80 to 90 with the heretofore known systems.

In the dispensing of solidified confection, such as ice cream, it is customary to provide the solidified confections in relatively large containers and to place these containers in suitable serving cabinets and to remove small portions of the confection for each individual serving. Because of the depth of the containers and the cabinets for holding the same, it is very inconvenient to secure the last remaining quantity of the confection from the container.

According to my invention, I have produced a supporting and positioning mechanism adapted to position a container of confection in such a position that it is always easy to operate to draw a portion of the confection from the container. My operating mechanism is particularly adapted to support a sectionalized container, such as described herein, but may be used with any suitable package.

In the system according to my invention, the confection is solidified in a sectionalized container, which container is preferably placed on a supporting structure which can elevate the container to the desired height for proper manipulation of the uppermost portion of the confection. If desired, the supporting structure can be placed in any suitable serving cabinet. A section of the container is then removed to expose the top layer of the confection, which may be cut off without the necessity of scooping or otherwise breaking down the cellular structure. As successive layers are disposed of, the container may be elevated and further sections removed so that at all times the dispensing is done from an exposed portion of the confection at the proper height for convenient cutting.

In the positioning device according to my invention, a framework is preferably placed within a protecting device, such as the usual dispensing cabinet and an elevating mechanism attached to the framework for supporting the can of confection and for elevating it to any desired height for ease in dispensing.

It is, accordingly, an object of my invention to provide a convenient method of dispensing a solidified confection.

It is a further object of my invention to provide a dispensing system which will not only make it easier to dispense solidified confections but also make it possible to dispense the confections without material destruction of the cellular structure so that the flavor of the material is unimpaired and a larger number of salable articles may be made from each package of the confection.

It is a further object of my invention to provide a sectionalized container for packaging a solidified confection.

It is a further object of my invention to provide a means for removing sections of a container for exposing a solidified confection for ease in dispensing.

It is a further object of my invention to provide a supporting member for properly positioning the confection for dispensing.

It is a further object of my invention to provide a can supporting mechanism for supporting a package of solidified confection.

It is a further object of my invention to provide a can supporting mechanism which may be installed in the existing serving cabinets.

It is a further object of my invention to provide a can elevating mechanism for supporting a package of confection at any convenient elevation.

Other objects and advantages of my invention will be apparent from the following detailed description taken in conjunction with the accompanying drawings, in which:

Fig. 5 is a section through an assembled blank according to my invention;

Fig. 6 is a similar view showing a modification of the joint structure;

Fig. 7 is a sectional elevation partially broken away, of a package according to my invention;

Fig. 8 is a modified package according to my invention;

Fig. 9 is a further modification of a package according to my invention;

Fig. 10 is a perspective view of the stripper member for removing the sections of the confection package;

Fig. 11 is a perspective view showing the method of gripping the portion of the container;

Fig. 12 shows the operation of the stripper to remove a section of the container to expose the confection for use;

Fig. 13 is a plan elevation of a serving cabinet embodying my invention;

Fig. 14 is a sectional elevation through a serving cabinet showing the method of positioning the lifting mechanism within the cabinet;

Fig. 15 is a similar view showing the position of the elevating mechanism;

Fig. 16 is a fragmentary sectional elevation through a portion of my lifting mechanism showing the can support in stationary position;

Fig. 17 is a view similar to Fig. 16 showing the lifting motion of the elevating mechanism;

Fig. 18 is a similar view showing the release of the can holding mechanism;

Figure 1:
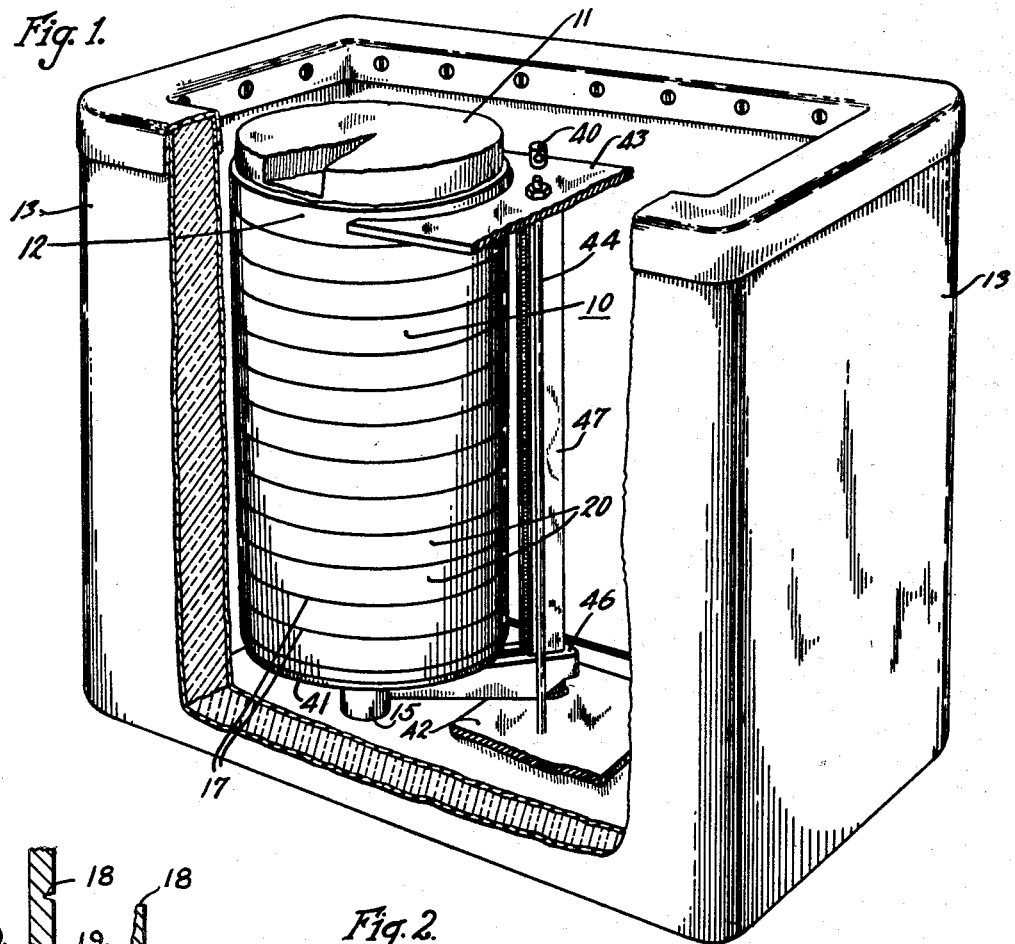
Figure 1 is a perspective view of a dispensing cabinet with a portion broken away to illustrate the method of dispensing a confection.
Figure 2:
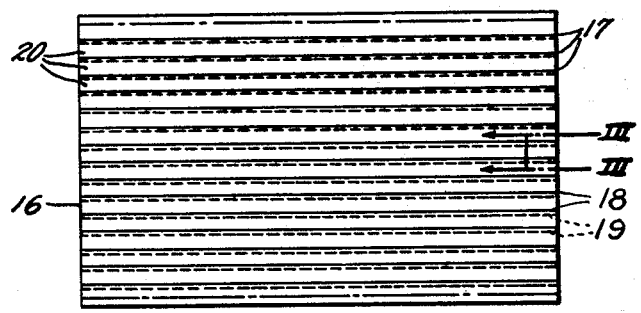
Fig. 2 is a plan view of a blank for forming the container according to my invention.

In the illustrative embodiment of my invention, the confection package 10 is composed of a solidified confection 11 received in a suitable sectionalized container 12, the whole being placed within a suitable serving cabinet 13 so that the sectionalized container rests on a suitable elevating mechanism 15 by which the package 10 may be raised within the serving cabinet 13 to a suitable level for properly dispensing the confection 11.

The blank 16 for forming the container 12 for my package 10 is preferably constructed of suitable flexible tearable material, such as paper, cardboard, parchment, cellulose, pressboard, fiberboard, or other suitable material generally of a fibrous structure, usually referred to in the art as paper.

Figure 4:
Fig. 4 is a section similar to Fig. 3, showing the method of cleavage of the sections.
Figure 3:
Fig. 3 is an enlarged section taken in the direction of the arrows along the line III—III of Fig. 2 and shifted through 90'.

In order to provide suitable sections 20, I prefer to provide cleavage lines 17 in such a manner that when the can 12 is assembled, the cleavage lines 17 will be transverse to the length of the can so that the can is frangible at the cleavage lines 17, permitting a portion of the can to be broken away, exposing the contents. While these cleavage lines 17 may be made by weakening the material of the container 12 in any suitable manner, I prefer to construct the cleavage lines 17 by constructing offset incisions 18—19 disposed on opposite sides of the container wall, each of which extends approximately half way through the material forming the side wall of the container 12. This forms a perfectly fluid-tight container 12 so that when the semi-fluid confection, such as custard or ice cream mix, is poured into the container 12, there will be no leakage. However, after the solidified material 11 is in condition to serve, a direct pull will cause the section 20 to break away, as shown in Fig. 4 of the drawings, so that the sections 20 are readily removed to expose the confection 11 for dispensing.

In order to store and ship the containers 12 conveniently, it is desirable to provide them in so-called "knocked-down" form, that is, the tops 21 and bottoms 22 of the container are separable and the side walls of the container 12 may be pressed down flat as shown in Figs. 5 and 6 to secure the minimum storing space.

To facilitate the removal of the sections 20, it is desirable to provide a longitudinal seam along one side of the container, and to provide a suitable gripping means so that it is easy to grasp the gripping means and break the seal or joint so that the section may be connected to a suitable stripper for removing it from the solidified confection.

In Fig. 5 I have shown one form of joint in which the material of the container is overlapped to make a so-called lap-joint 23 with a portion 24 of the container material extending freely beyond the joint 23 so that it may be easily gripped by any suitable tool, or even by the fingers of the operator.

In Fig. 6, I have shown a modified joint 25 in which the material of the container 12 is butted together and the seam made by applying a suitable sealing material 26, such as a strip of paper or fabric which is glued in position over the seam. A portion 27 of the applied material is preferably left unglued so that it extends and forms a convenient gripping member.

In setting up the containers 12, it is desirable to expand the same substantially to its shape and to insert a bottom member 22 which then forms the container or can 12 to its desired shape. Usually the container 12 is round in cross-section but any suitable cross-section may be utilized. When the can 12 is rectangular in cross-section, it has been found desirable to place the breaking joint at some point other than at a corner of the container for convenience in breaking the joint.

In the preferred form of package according to my invention, the bottom end of the container 12 is provided with a suitable ledge 30 for supporting the bottom member 22 of the container. Preferably, the ledge 30 is made by spinning in the end of the can body. However, instead of spinning in the bottom end of the container 12, a suitable ledge forming member may be secured in any suitable manner to the bottom end of the can 12. It is desirable to form one of the cleavage lines 17 at the point in the side wall of the can 12 so that when the last section 20 is removed it will remove flush with the top of the bottom member 22, thus allowing access to all of the confection contained within the package 10.

While any suitable capping member may be utilized on the top of the package, I prefer to provide an outwardly flaring flange 31 which will cooperate with a downwardly and inwardly flanged top 21 to seal dirt and other foreign substances out of the package 10 during shipping.

Where it is inconvenient to provide a container having the cleavage lines 17, my method can still be utilized by taking a package 10 of solidified confection and sectionalizing the same by cutting annular slots either partway or completely through the container, and preferably slightly into the frozen material, as shown in Fig. 8, so that the package is in the form of a container cut into rings 20' and a solidified confection 11 maintaining the entire package 10 in proper form. The cleavage lines may also be formed by perforating the material of the container as shown in Fig. 9 if care is taken to make the perforations tight enough that the semi-fluid confection will not leak therethrough when the package 10 is being constructed.

While obviously the sections 20 of the package 10 may be removed by hand, I have found it desirable to provide a stripper 35 for conveniently removing successive sections from the container. In Fig. 10, I have shown a suitable stripping member 35 for gripping and removing a section of the container. The stripper 35 comprises a substantially tubular member 36 which may be journalled on any suitable bearing, such as the top end of the lifting rod 40 disposed adjacent to the package 10. The stripper member 35 is provided with a suitable slot 33 to provide a finger 38 for engaging a section 20 of the container 12. The stripper 35 then being journalled over the bearing member, is rotated by means of a suitable handle 39 to wind the flexible material onto the tubular member 36 and strip it off of the solidified confection 11 which is preferably mounted on a suitable rotatable base 41 to facilitate the stripping action. While I have shown an upstanding journal 40 for the stripping member 35, it is obvious that a recessed journal might also be used and a projection of the stripping member 35 extend into the recessed journal.

The can positioning mechanism is preferably placed within the usual serving cabinet for holding a package 11 of a solidified confection, such as ice cream. The lifting mechanism comprises a bottom platform 42 adapted to rest on the bottom of the cabinet 13 and a top platform 43 adapted to be positioned slightly below the desired operating position of the confection 11. The top and bottom platforms 42 and 43 are connected together by any suitable mechanism, such as struts or bolts 44 to provide a package supporting framework.

The package 10 of confection sits on a suitable rotating support 41, preferably of slightly smaller diameter than the diameter of the package 10 of confection, so that the usual rim 45 of the package will telescope a portion of the supporting platform 41. The supporting platform 41 is entirely held by a holding arm 46, one end of which is associated with a suitable guide member 47 herein illustrated as a channel member. The holding arm 46 is provided with a gripping opening 48 surrounding the guiding member 47 so that when weight is applied to the extending end of the holding arm 46, the arm 46 is forced into locking contact with the guide member 47 as shown in Fig. 16. The holding arm 46 is then manipulated by a suitable lifting arm 50 which makes contact with the holding arm 46 at a point 51 adjacent the load bearing end. This lifting arm 50 has an opening 52 therein through which is passed a lifting rod 40. The size of the opening 52 is so arranged that when the rod 40 is lifted upwardly, it comes into binding contact with the opening 52 in the lifting arm 50, as shown in Fig. 17, lifting the same upwardly and applying pressure to the holding arm 46. The pressure applied to the holding arm 46 lifts the holding arm 46 out of binding engagement with the guiding member 47 and permits the holding arm 46, together with the confection package 10, to be raised upwardly to any desired level. The release of the lifting rod 40 releases the pressure on the lifting arm 50, which in turn, allows the load bearing end of the holding arm 46 to drop into locking relationship with the guide member 47.

When the confection has been removed, or for any reason it is desired to return the holding arm 46 to its initial position in the bottom of the cabinet 13, the entire mechanism may be released from the guide member 47 and the lifting rod 40 by lifting upwardly on the load bearing end of the holding arm 46. In this position, the holding action on both the guide member and the lifting rod is released as shown in Fig. 18, and the supporting mechanism may be lowered into the bottom of the cabinet 13. The arm 46 is provided with lugs 146 to maintain the arm 50 in proper relation to arm 46.

Figure 19:
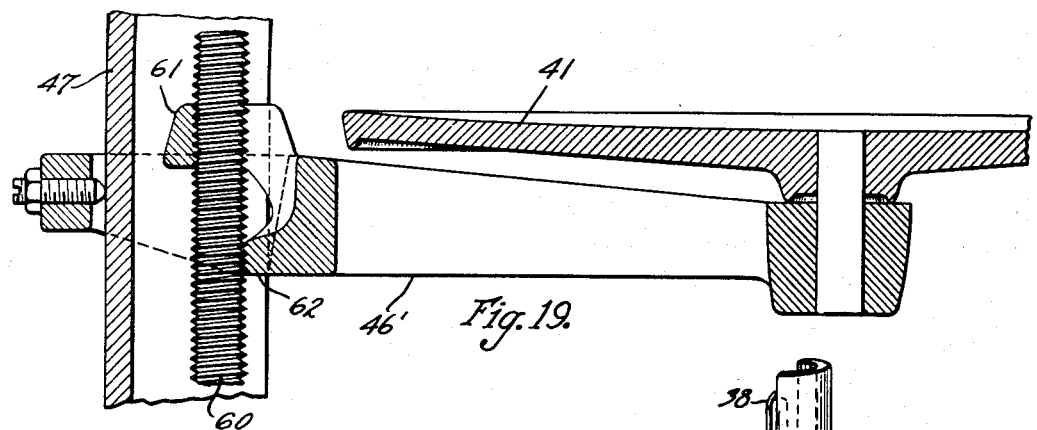
Fig. 19 is a view similar to Fig. 16 showing a modified lifting mechanism.
Figure 20:
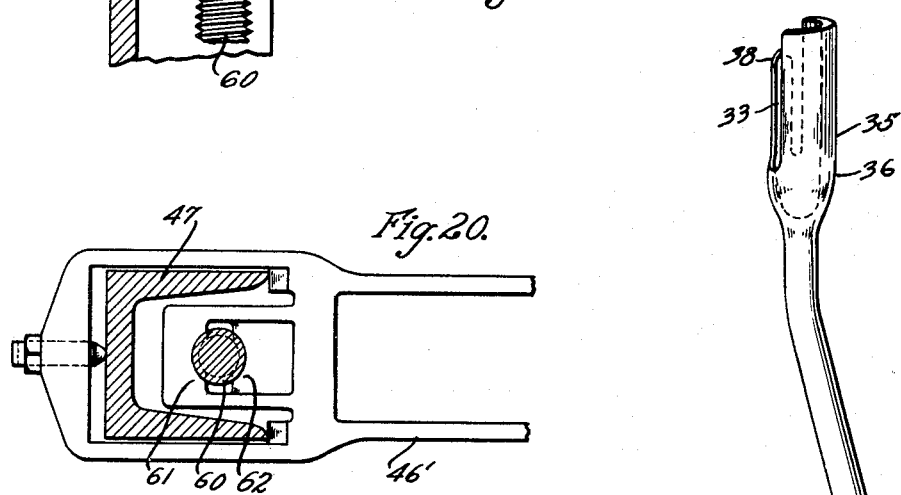
Fig. 20 is a partial plan view of the modification according to Fig. 19.

In the modification according to Figs. 19 and 20, the lifting arm 50 and the associated lifting rod 40 have been dispensed with and the entire holding arm 46' is controlled by a suitable threaded member 60 which engages a pair of half-nuts 61 and 62 integral with or attached to the holding arm 46. The rotation of the screw rod 60 causes the holding arm 46' to advance along the guide member 47 in any desired direction. Because of the half-nut arrangement, it is possible to shift the holding arm rapidly in either direction along the guide member 47 by lifting up on the load bearing end of the arm 46' to disengage the threads of the half-nuts 61—62 from the threaded rod 60. This enables the holding arm 46' to be positioned rapidly at any desired position and to be adjusted by means of the threaded driving connection.

Figure 21:
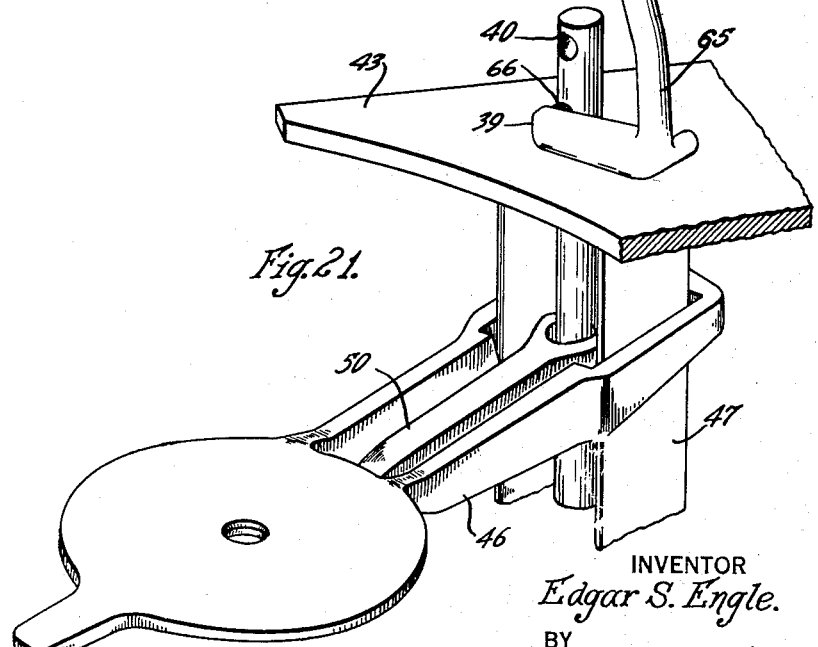
Fig. 21 is a fragmentary perspective view of the lifting mechanism showing the method of actuating the lifting device.

Since confections are dispensed by many people who have relatively small lifting strength, it is desirable to provide a lifting mechanism which can be operated with a minimum of exertion. For this purpose, I have provided a lifting handle 65 which has a portion 66 adapted to engage holes in the upper portion of the lifting rod 40 and an arm 39 connected to this portion, so that a relatively large leverage is available to apply a lift to the lifting rod. While any suitable support may be provided for the lifting handle 65, I prefer to fulcrum the lifting handle 65 directly on the top platform 43 as shown in Fig. 21, so that a minimum of mechanism is required for the operation of the device.

Obviously, the screw threaded device 60 according to Figs. 19 and 20 may be operated by any suitable rotating mechanism, but preferably a suitable handle will be applied to the top end of the rod 60 for this operation.

While for purposes of illustration, I have shown and described a specific embodiment of my invention, it will be apparent that changes and modifications can be made therein without departing from the true spirit of my invention or the scope of the appended claims.

I claim as my invention:

1. A confection handling device comprising a cabinet for protecting the confection, a sectionalized container for said confection, a support for engaging the bottom of said container, a holding arm engaging said support, a guide member for said arm, said arm being in locking engagement in one direction with said guide member, a lifting arm engaging said holding arm, and a lifting rod having locking engagement in one direction with said lifting arm.

2. In an ice cream dispensing system, a supporting means for a container having ice cream therein, a bearing on said supporting means, a member adapted to engage said bearing, a slot in said member for engaging a portion of said container, and means for operating said member for stripping a portion of the container to expose the ice cream.

3. In a confection dispensing system, a paper container, support means for said container, a bearing on said supporting means adjacent said container, a stripper member journalled on said bearing, a slot in said stripper member to receive a portion of said container, and means to rotate said stripper to strip a portion of said container from the confection.

4. A stripper device for stripping portions of a sectionalized container from a solidified confection comprising a supporting framework, a bearing on said framework adjacent the container, a substantial cylindrical member engaging said bearing, means on said member for engaging a portion of the sectionalized container, and means for operating said member to remove a section of said container from the confection.

5. A dispensing system comprising a dispensing cabinet, a frame structure in said cabinet, a guide member on said frame structure, a package holding arm engaged with said guide member, a package of confection supported by said holding arm, means for moving said holding arm along said guide member for positioning said package, a sectionalized container comprised in said package and means for stripping a portion of the container from the package to expose the confection.

6. A dispensing system comprising a dispensing cabinet, a frame structure in said cabinet, a guide member on said frame structure, a package holding arm engaged with said guide member, a package of confection supported by said holding arm, a lifting arm connected with said holding arm, means for actuating said lifting arm to position said holding arm on said guide member and a package supported by said holding arm.

7. A dispensing system for a solidified confection comprising a package supporting means having top and bottom members, means for securing said top and bottom members in spaced relationship, a guide member in said supporting means, a holding arm engaging said guide member, means on said holding arm for supporting a package of confection, and a lifting arm for moving said holding arm along said guide member.

8. In a dispensing system, a package positioning device comprising spaced apart top and bottom members, a guide member extending between said top and bottom members, said guide member being channel-shape in cross-section, a holding arm having an opening engaging said guide member, said opening being adapted to make binding engagement with said guide member, a lifting arm engaged with said holding arm, a lifting rod, said lifting arm having an opening engaging said lifting rod.

9. In a dispensing system, a package positioning device comprising spaced apart top and bottom members, a guide member extending between said top and bottom members, said guide member being channel-shape in cross-section, a holding arm having an opening engaging said guide member, said opening being adapted to make binding engagement with said guide member, a lifting arm engaged with said holding arm, a lifting rod, said lifting arm having an opening engaging said lifting rod, a lifting lever bearing on said top member engaging the lifting rod.

10. In a dispensing system, a package positioning device comprising spaced apart top and bottom members, a guide member extending between said top and bottom members, said guide member being channel-shape in cross-section, a holding arm having an opening engaging said guide member, said opening being adapted to make binding engagement with said guide member, a lifting arm engaged with said holding arm, a lifting rod, said lifting arm having an opening engaging said lifting rod, said lifting rod being placed within the channel-shaped guide member.

11. A package elevating device comprising a frame structure including top and bottom members connected in spaced relation, a channel-shaped guide member in said frame, an arm having an opening engaging the guide member, a load bearing portion on said arm in spaced relation to said guide member, a lifting arm engaging said first-mentioned arm adjacent the load bearing portion, a lifting rod engaging said lifting arm.

12. A package elevating device comprising a frame structure including top and bottom members connected in spaced relation, a channel-shaped guide member in said frame, an arm having an opening engaging the guide member, a load bearing portion on said arm in spaced relation to said guide member, a lifting arm engaging said first-mentioned arm adjacent the load bearing portion, a lifting rod engaging said lifting arm, a bell crank lever engaging the lifting rod for actuating the lifting rod and bearing on said frame structure to elevate the first-mentioned arm.

13. A package positioning device comprising a frame structure including top and bottom members connected in spaced relation, a guide member in said frame, an arm having a portion engaging the guide member, a pair of oppositely disposed, offset threaded members on said arm, a threaded rod engaging said threaded members for positioning the arm on said guide member, said arm being movable to disengage said threaded members from said threaded rod.

EDGAR S. ENGLE.